(12) United States Patent
Codrescu et al.

(10) Patent No.: US 8,380,966 B2
(45) Date of Patent: Feb. 19, 2013

(54) METHOD AND SYSTEM FOR INSTRUCTION STUFFING OPERATIONS DURING NON-INTRUSIVE DIGITAL SIGNAL PROCESSOR DEBUGGING

(75) Inventors: Lucian Codrescu, Austin, TX (US); William C. Anderson, Austin, TX (US); Suresh Venkumahanti, Austin, TX (US); Louis Achille Giannini, Berwyn, IL (US); Manojkumar Pyla, San Diego, CA (US); Xufeng Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 11/560,344

(22) Filed: Nov. 15, 2006

(65) Prior Publication Data

US 2008/0114972 A1 May 15, 2008

(51) Int. Cl.
*G06F 11/00* (2006.01)
(52) U.S. Cl. ............... 712/227; 712/32; 712/38; 714/35
(58) Field of Classification Search .................. 712/38, 712/32, 227; 714/35
See application file for complete search history.

(56) References Cited

U.S. PATENT DOCUMENTS

| | | | |
|---|---|---|---|
| 4,080,650 A * | 3/1978 | Beckett ........................ 717/129 |
| 4,669,059 A | 5/1987 | Little et al. |
| 4,901,307 A | 2/1990 | Gilhousen et al. |
| 5,093,914 A | 3/1992 | Coplien et al. |
| 5,103,459 A | 4/1992 | Gilhousen et al. |
| 5,136,717 A | 8/1992 | Morley et al. |
| 5,544,311 A | 8/1996 | Harenberg et al. |
| 5,551,043 A | 8/1996 | Crump et al. |
| 5,944,841 A | 8/1999 | Christie |

(Continued)

FOREIGN PATENT DOCUMENTS

| EP | 1411434 A2 | 4/2004 |
|---|---|---|
| JP | 2183362 A | 7/1990 |

(Continued)

OTHER PUBLICATIONS

Hartvigsen, J., et al.; "JUAG/Debug Interface"; Motorola Technical Developments, Motorola Inc., Schaumburg, Illinois, US; vol. 19, Jun. 1, 1993; pp. 107-109.

(Continued)

*Primary Examiner* — Aimee Li
(74) *Attorney, Agent, or Firm* — Peter M. Kamarchik; Nicholas J. Pauley; Jonathan T. Velasco

(57) ABSTRACT

Techniques for the design and use of a digital signal processor, including (but not limited to) for processing transmissions in a communications (e.g., CDMA) system. Stuffing instructions in a processing pipeline of a multi-threaded digital signal processor provides for operating a core processor process and a debugging process within a debugging mechanism. Writing a stuff instruction into a debugging process registry and a stuff command in a debugging process command register provides for identifying a predetermined thread of the multi-threaded digital signal processor in which to execute the stuff instruction. The instruction stuffing process issues a debugging process control resume command during a predetermined stage of executing on the predetermined thread and directs the core processor to perform the stuff instruction during the debugging process. The core processor may then execute the stuffed instruction in association with the core processor process and the debugging process.

35 Claims, 10 Drawing Sheets

U.S. PATENT DOCUMENTS

| | | | |
|---|---|---|---|
| 5,951,696 A | 9/1999 | Naaseh et al. |
| 6,018,759 A | 1/2000 | Doing et al. |
| 6,029,248 A | 2/2000 | Clee et al. |
| 6,052,708 A | 4/2000 | Flynn et al. |
| 6,067,588 A | 5/2000 | Ito |
| 6,106,571 A | 8/2000 | Maxwell |
| 6,199,181 B1 | 3/2001 | Rechef et al. |
| 6,202,172 B1 | 3/2001 | Ponte |
| 6,212,544 B1 | 4/2001 | Borkenhagen et al. |
| 6,226,749 B1 | 5/2001 | Carloganu et al. |
| 6,249,907 B1 | 6/2001 | Carter et al. |
| 6,314,530 B1 | 11/2001 | Mann |
| 6,341,347 B1 | 1/2002 | Joy et al. |
| 6,343,371 B1 | 1/2002 | Flanagan et al. |
| 6,467,054 B1 | 10/2002 | Lenny |
| 6,480,818 B1 | 11/2002 | Alverson et al. |
| 6,532,553 B1 * | 3/2003 | Gwilt et al. ................... 714/38 |
| 6,567,839 B1 | 5/2003 | Borkenhagen et al. |
| 6,665,802 B1 | 12/2003 | Ober |
| 6,684,348 B1 | 1/2004 | Edwards et al. |
| 6,697,935 B1 | 2/2004 | Borkenhagen et al. |
| 6,708,270 B1 | 3/2004 | Mayer |
| 6,714,958 B1 | 3/2004 | Tudor |
| 6,757,829 B1 | 6/2004 | Laczko et al. |
| 6,798,713 B1 | 9/2004 | Yearsley et al. |
| 6,832,334 B2 | 12/2004 | Wojcieszak et al. |
| 6,834,360 B2 | 12/2004 | Corti et al. |
| 6,915,416 B2 | 7/2005 | Deng et al. |
| 6,981,261 B2 | 12/2005 | Kalafatis et al. |
| 7,013,400 B2 | 3/2006 | Kalla et al. |
| 7,020,871 B2 | 3/2006 | Bernstein et al. |
| 7,047,451 B2 | 5/2006 | Agarwala et al. |
| 7,055,139 B2 | 5/2006 | Balle et al. |
| 7,073,059 B2 | 7/2006 | Worely et al. |
| 7,076,804 B2 | 7/2006 | Kershenbaum et al. |
| 7,080,289 B2 | 7/2006 | Swaine et al. |
| 7,093,236 B2 | 8/2006 | Swaine et al. |
| 7,131,114 B2 | 10/2006 | Nguyen et al. |
| 7,185,319 B2 | 2/2007 | Kaler et al. |
| 7,203,926 B2 | 4/2007 | Bogle et al. |
| 7,210,064 B2 | 4/2007 | Mayer |
| 7,213,134 B2 | 5/2007 | Soltis, Jr. et al. |
| 7,222,262 B2 | 5/2007 | Prasadh et al. |
| 7,254,716 B1 | 8/2007 | Giles et al. |
| 7,278,058 B1 | 10/2007 | Narisi |
| 7,318,017 B2 | 1/2008 | Swoboda |
| 7,321,957 B2 | 1/2008 | Khan et al. |
| 7,360,117 B1 | 4/2008 | Boike et al. |
| 7,369,954 B2 | 5/2008 | Levine et al. |
| 7,370,210 B2 | 5/2008 | Symes |
| 7,380,112 B2 | 5/2008 | Okabayashi et al. |
| 7,380,276 B2 | 5/2008 | Saha et al. |
| 7,383,537 B2 | 6/2008 | Darweesh et al. |
| 7,383,540 B2 | 6/2008 | Kalra |
| 7,421,571 B2 | 9/2008 | Shoemaker |
| 7,437,619 B2 | 10/2008 | McCullough et al. |
| 7,461,407 B2 | 12/2008 | Little et al. |
| 7,472,378 B2 | 12/2008 | Bennett et al. |
| 7,475,303 B1 | 1/2009 | Edgar et al. |
| 7,512,954 B2 | 3/2009 | Srivastava et al. |
| 7,577,878 B2 | 8/2009 | Baradie et al. |
| 7,594,146 B2 | 9/2009 | Horikawa et al. |
| 7,600,221 B1 | 10/2009 | Rangachari |
| 7,657,791 B2 | 2/2010 | Codrescu et al. |
| 7,657,875 B2 | 2/2010 | Alexander, III et al. |
| 7,770,155 B2 | 8/2010 | Bates et al. |
| 7,770,156 B2 | 8/2010 | Thekkath |
| 7,823,131 B2 | 10/2010 | Gard et al. |
| 7,890,316 B2 | 2/2011 | Swoboda et al. |
| 7,917,907 B2 | 3/2011 | Ahmed et al. |
| 8,136,097 B2 | 3/2012 | Konishi et al. |
| 8,196,109 B2 | 6/2012 | Fung et al. |
| 8,239,838 B2 | 8/2012 | Yim et al. |
| 2001/0027538 A1 | 10/2001 | Wojcieszak et al. |
| 2002/0004933 A1 | 1/2002 | Dzoba et al. |
| 2002/0035721 A1 | 3/2002 | Swoboda |
| 2002/0065646 A1 | 5/2002 | Waldie et al. |
| 2002/0099977 A1 | 7/2002 | Wong |
| 2003/0014643 A1 | 1/2003 | Asami et al. |
| 2003/0037225 A1 | 2/2003 | Deng et al. |
| 2003/0037226 A1 | 2/2003 | Tsuruta et al. |
| 2003/0061550 A1 | 3/2003 | Ng et al. |
| 2003/0065963 A1 | 4/2003 | Gregg |
| 2003/0074650 A1 | 4/2003 | Akgul et al. |
| 2003/0097615 A1 | 5/2003 | Corti et al. |
| 2003/0135720 A1 | 7/2003 | DeWitt, Jr. et al. |
| 2004/0024995 A1 | 2/2004 | Swaine |
| 2004/0103397 A1 | 5/2004 | Agarwala et al. |
| 2004/0103398 A1 | 5/2004 | Agarwala et al. |
| 2004/0105298 A1 | 6/2004 | Symes |
| 2004/0117768 A1 | 6/2004 | Chang et al. |
| 2004/0123274 A1 | 6/2004 | Inagaki et al. |
| 2004/0133823 A1 | 7/2004 | Swoboda et al. |
| 2004/0170046 A1 | 9/2004 | Belnet et al. |
| 2004/0170168 A1 | 9/2004 | Dedek |
| 2004/0177269 A1 | 9/2004 | Belnet et al. |
| 2004/0205747 A1 | 10/2004 | Bernstein et al. |
| 2004/0260910 A1 | 12/2004 | Watt et al. |
| 2005/0034024 A1 | 2/2005 | Alverson et al. |
| 2005/0034039 A1 | 2/2005 | Prasadh et al. |
| 2005/0044534 A1 | 2/2005 | Darweesh et al. |
| 2005/0091520 A1 | 4/2005 | Khan et al. |
| 2005/0108689 A1 | 5/2005 | Hooper et al. |
| 2005/0132338 A1 | 6/2005 | Kalra |
| 2005/0177703 A1 | 8/2005 | Norden et al. |
| 2005/0177819 A1 | 8/2005 | Ober et al. |
| 2005/0188358 A1 | 8/2005 | Johnson et al. |
| 2005/0193277 A1 | 9/2005 | Horikawa et al. |
| 2005/0246691 A1 | 11/2005 | Hsieh et al. |
| 2005/0268168 A1 | 12/2005 | Ishihara |
| 2006/0026594 A1 | 2/2006 | Yoshida et al. |
| 2006/0048099 A1 | 3/2006 | Templin et al. |
| 2006/0069953 A1 | 3/2006 | Lippett et al. |
| 2006/0129999 A1 | 6/2006 | Hiraoka et al. |
| 2006/0179281 A1 | 8/2006 | Jensen et al. |
| 2006/0184835 A1 | 8/2006 | Al-Omari et al. |
| 2006/0206902 A1 | 9/2006 | Jamil et al. |
| 2006/0212759 A1 | 9/2006 | Campbell et al. |
| 2006/0242470 A1 | 10/2006 | McCullough et al. |
| 2006/0248394 A1 | 11/2006 | McGowan |
| 2006/0248395 A1 | 11/2006 | McGowan |
| 2006/0248401 A1 | 11/2006 | Carroll et al. |
| 2006/0253894 A1 | 11/2006 | Bookman et al. |
| 2006/0259831 A1 | 11/2006 | Sohm et al. |
| 2006/0279439 A1 | 12/2006 | Swoboda |
| 2006/0282419 A1 | 12/2006 | Sen et al. |
| 2006/0282734 A1 | 12/2006 | Milne et al. |
| 2007/0016959 A1 | 1/2007 | Ikeda et al. |
| 2007/0043861 A1 | 2/2007 | Baron et al. |
| 2007/0089095 A1 | 4/2007 | Thekkath et al. |
| 2007/0180333 A1 | 8/2007 | Thekkath et al. |
| 2007/0180431 A1 | 8/2007 | Agarwala et al. |
| 2007/0220360 A1 | 9/2007 | Weinert et al. |
| 2007/0234306 A1 | 10/2007 | Klinger et al. |
| 2007/0240125 A1 | 10/2007 | Degenhardt et al. |
| 2007/0271461 A1 | 11/2007 | Hardy et al. |
| 2007/0288906 A1 | 12/2007 | Agarwala et al. |
| 2008/0010640 A1 | 1/2008 | Foo |
| 2008/0027961 A1 | 1/2008 | Arlitt et al. |
| 2008/0028196 A1 | 1/2008 | Kailas |
| 2008/0034350 A1 | 2/2008 | Conti |
| 2008/0052681 A1 | 2/2008 | Yang |
| 2008/0059963 A1 | 3/2008 | Foo |
| 2008/0080651 A1 | 4/2008 | Edgar |
| 2008/0098207 A1 | 4/2008 | Reid et al. |
| 2008/0115011 A1 | 5/2008 | Codrescu et al. |
| 2008/0115113 A1 | 5/2008 | Codrescu et al. |
| 2008/0115115 A1 | 5/2008 | Codrescu et al. |
| 2008/0209176 A1 | 8/2008 | Singh et al. |
| 2008/0256339 A1 | 10/2008 | Xu et al. |
| 2008/0256396 A1 | 10/2008 | Giannini et al. |
| 2008/0288808 A1 | 11/2008 | Moyer |
| 2009/0007076 A1 | 1/2009 | Al-Omari et al. |
| 2009/0132863 A1 | 5/2009 | Ashfield et al. |
| 2009/0199162 A1 | 8/2009 | Choi et al. |

FOREIGN PATENT DOCUMENTS

| | | |
|---|---|---|
| JP | 04145544 | 5/1992 |
| JP | 8055023 A | 2/1996 |
| JP | 8087366 A | 4/1996 |
| JP | 9167105 A | 6/1997 |
| JP | 2001154873 A | 6/2001 |
| JP | 2001519947 A | 10/2001 |
| JP | 2001331340 A | 11/2001 |
| JP | 2001521215 T | 11/2001 |
| JP | 2003177938 A | 6/2003 |
| JP | 2004171563 A | 6/2004 |
| JP | 2004171564 A | 6/2004 |
| JP | 2006285430 A | 10/2006 |
| KR | 20010031167 | 4/2001 |
| KR | 20060049710 | 5/2006 |
| TW | 200625070 | 7/2006 |
| WO | WO9921089 | 4/1999 |
| WO | WO0068780 | 11/2000 |
| WO | 0118651 | 3/2001 |
| WO | WO2006030195 A2 | 3/2006 |

OTHER PUBLICATIONS

International Search Report-PCT/US07/084587, International Search Authority-European Patent Office-Sep. 22, 2008.
Written Opinion-PCT/US07/084587, International Search Authority-European Patent Office-Sep. 22, 2008.
"Processor-Controlled Battery Back-Up Power Supply Architecture" IBM Technical Disclosure Bulletin, IBM Corp. New York, US, vol. 31, No. 3, (Aug. 1, 1988), pp. 183-185, XP000119002, ISSN: 0018-8689.
"Technique for Power Management in Signal Processors" IBM Technical Disclosure Bulletin, IBM Corp. New York, US, vol. 35, No. 5, (Oct. 1, 1992), pp. 425-427, XP000313036.
Universal Mobile Telecommunications System (UMTS) ETSI Standards, European Telecommunications Standards Institute, Sophia Antipo, FR, vol. 3 R2, No. V610, Jun. 2004, XP014016761.
Wu C E et al: "Trace-based analysis and 1-35 tuning for distributed parallel applications" Parallel and Distributed Systems, 1994. International Conference on Hsinchu, Taiwan Dec. 19-21, 1994, Los Alamitos, CA, USA,IEEE Comput. Soc, Dec. 19, 1994, pp. 716-723, XPOI0223604 ISBN: 978-0-8186-6555-4.
Yang Gian et al: "Cycle accurate thread 1-35 timer for linux environment" Performance Analysis of Systems and Software, 2001. ISPASS. 2001 IEEE International Symposium on Nov. 4-6, 2001, Piscataway, NJ, USA,IEEE, Nov. 4, 2001, pp. 38-44, XPOI0583886 ISBN: 978-0-7695-7230-7.
Microsoft Press Computer Dictionary, Third Edition, "operating system," Microsoft Press (Aug. 1, 1997), ISBN 1-57231-446-X, p. 341.
Translation of Office Action in Korean Application 10-2009-7023540 corresponding to U.S. Appl. No. 11/734,199; citing WO06030195 and KR20060049710 dated Feb. 17, 2011.
Jiang, "Enhancing System-on-Chip Verification Using Embedded Test Structures", Dec. 2005, pp. 1-61.
Vermeulen et al., "Core-Based Scan Architecture for Silicon Debug", IEEE, 2002, pp. 638-647.
ARM Limited, Embedded Trace Macrocell 9—Technical Reference Manual, 2002, 164 pages, <http://rtds.cs.tamu.edu/web_462/techdocs/ARM/debug/DDI0157F_ETM9_r2p2.pdf>.
Blair Fort, et al., "A Multithreaded Soft Processor for SOPC Area Reduction", IEEE International Symposium on Custom Computing Machines, Napa, CA, Oct. 2006.
IEEE computer society, pp. 131-142.
Kreuzinger J, et al: "Context-Switching Techniques for Decoupled Multithreaded Processors" Euromicroconference, 1999, Proceedings. 25th Milan, Italy Sept. 8-10, 1999, Los Alamitos, CA, USA, IEEE Comput, Soc, US, vol. 1, (Sep. 8, 1999), pp. 248-251.
Ungerer Theo, "A Survey of Processors With Explicit Multithreading, Mar. 2003 (29-63)," ACM Computing Survey, 2003, 35 (1).
Camera et al.," An integrated debugging environment for reprogrammable hardware systems", Sep. 2005, pp. 111-115, <http://delivery.acm.org/1 0.1145/1090000/1085145/p111-camera.pdf>.
Vermeulen et al.," Automatic generation of breakpoint hardware for silicon debug", Jun. 2004, pp. 514-517,<http://delivery.acm.org/1 0.1145/1 000000/996708/p514- vermeulen.pdf>.
Andrews et al, "Xbox 360 system Architecture", 2006.
Compan et al., GENVIEW: A Portable Source-Level Debugger for Macrocell Generators, 1991, 5 pages, <http://ieeexplore.ieee.org/stamp/stamp.jsp?tp=&arnumber=206436&userType=inst>.
Mayer et al., Debug support, Clibration and Emulation for Multiple Processor and Powertrain Control SoCs, 2005, 5 pages, <http://ieeexplore.ieee.org/stamp/stamp.jsp?arnumber=01395811>.
Rootselaar et al., "Debugging of system-on-a-chip",1997.
Taiwan Search Report—TW096143234—TIPO—Mar. 23, 2012.
Vermeulen et al., "Silicon Debug of a Co-processor Array for Video Applications",2000.

\* cited by examiner

| REGISTER NAME | DESCRIPTION | REGISTER ADDRESS | ISDB TRUSTED ACCESS | ISDB UNTRUSTED ACCESS | CORE ACCESS SUPERVISOR MODE[a] |
|---|---|---|---|---|---|
| ISDBST | ISDB STATUS | 0x0 | R | R[b] | R |
| ISDBCFG0 | ISDB CONFIG 0 | 0x1 | R/W | NONE | NONE |
| ISDBCFG1 | ISDB CONFIG 1 | 0x2 | R/W | NONE | NONE |
| BRKPTINFO | BREAKPOINT INFO | 0x3 | R | NONE | NONE |
| BRKPTINC0 | BREAKPOINT 0 ADDRESS | 0x4 | W | NONE | NONE |
| BRKPTING0 | BREAKPOINT 0 CONFIG | 0x5 | W | NONE | NONE |
| BRKPTINC1 | BREAKPOINT 1 ADDRESS | 0x6 | W | NONE | NONE |
| BRKPTING1 | BREAKPOINT 1 CONFIG | 0x7 | W | NONE | NONE |
| STFINST | STUFF INSTRUCTION | 0x8 | W | NONE | NONE |
| ISDBMBXIN | MAILBOX IN (ISDB→CORE) | 0x9 | W | W | R |
| ISDBMXOUT | MAILBOX IN (CORE→ISDB) | 0xA | R | R | W |
| ISDBCMD | ISDB COMMAND | 0xB | W | W[c] | NONE |
| ISDB_EN | ISDB ENABLE | 0xC | R/W | R/W | NONE |
| ISDB_VERSION | ISDB VERSION | 0xD | R | R | NONE |
| ISDB_GPR | ISDB GENERAL PURPOSE REGISTER | 0xF | R/W | NONE | R/W |

[a] NO ACCESS IS ALLOWED FROM THE CORE IN USER MODE
[b] ONLY BITS 4:0 ARE VISIBLE IN UNTRUSTED MODE
[c] ONLY THE INTERRUPT COMMAND IS AVAILABLE

FIG. 9

METHOD AND SYSTEM FOR INSTRUCTION STUFFING OPERATIONS DURING NON-INTRUSIVE DIGITAL SIGNAL PROCESSOR DEBUGGING

RELATED APPLICATION

This application is related to the following United States patent application numbers: application Ser. No. 11/560,217, filed Nov. 15, 2006, entitled NON-INTRUSIVE, THREAD-SELECTIVE, DEBUGGING METHOD AND SYSTEM FOR A MULTI-THREADED DIGITAL SIGNAL PROCESSOR; U.S. patent application Ser. No. 11/560,323, now U.S. Pat. No. 7,657,791, filed Nov. 15, 2006, entitled METHOD AND SYSTEM FOR A DIGITAL SIGNAL PROCESSOR DEBUGGING DURING POWER TRANSITIONS; U.S. patent application Ser. No. 11/560,332, filed Nov. 15, 2006, entitled METHOD AND SYSTEM FOR TRUSTED/UNTRUSTED DIGITAL SIGNAL PROCESSOR DEBUGGING OPERATIONS U.S. patent application Ser. No. 11/560,339, filed Nov. 15, 2006, entitled EMBEDDED TRACE MACROCELL FOR ENHANCED DIGITAL SIGNAL PROCESSOR DEBUGGING OPERATIONS.

FIELD

The disclosed subject matter relates to data processing systems and processes such as may find use in data communications and similar applications. More particularly, this disclosure relates to a novel and improved method and system for instruction stuffing operations during non-intrusive digital signal processor debugging operations.

DESCRIPTION OF THE RELATED ART

Increasingly, telecommunications and other types of electronic equipment and supporting video, complex audio, videoconferencing and other rich software applications involve signal processing. Signal processing requires fast mathematical calculations and data generation in complex, but repetitive algorithms. Many applications require computations in real-time, i.e., the signal is a continuous function of time, which must be sampled and converted to digital signals for numerical processing. The processor must execute algorithms performing discrete computations on the samples as they arrive.

The architecture of a digital signal processor (DSP) is optimized to handle such algorithms. The characteristics of a good signal processing engine include fast, flexible arithmetic computation units, unconstrained data flow to and from the computation units, extended precision and dynamic range in the computation units, dual address generators, efficient program sequencing, and ease of programming.

One promising application of DSP technology includes communications systems such as a code division multiple access (CDMA) system that supports voice and data communications, as well as text messaging and other applications, between users over a satellite or terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459 entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that may more efficiently transmit packet data is offered by a consortium named the "$3^{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA Standard.

Complex DSP operational software employing the W-CDMA Standard, for example, requires robust development tools. Such development tools may include those for code generation, integration, testing, debugging, and evaluating application performance. In developing and operating software or complex DSP applications, such as advanced telecommunications applications, there is the need for sophisticated, yet non-intrusive debugging software. That is, debugging software applications must be not only sufficiently robust to monitor, test, and support the correction of software defects and operational problems, but also they may operate so as not to interfere with the core processor software during debugging operations. Otherwise, any problems in the core processing software may not be detected or detected properly during the use of such debugging software.

Moreover, during or in association with non-intrusive debugging processes, there is frequently the need to operate a variety of diagnostic, analytical, and other processes for determining various aspects of core processor operations. Such diagnostic, analytical, and similar programs may vary according to the specific type and amount of information a use may desire or an associated debugging process may need. Accordingly, the ability to insert or stuff instructions into a debugging process dynamically could have significant advantages.

Presently, however, no known way to perform instruction stuffing operations exists for debugging core processes in association with a multi-threaded digital signal processor as has been here described. Yet further, no instruction stuffing process exists that may be thread-selective by performing the functions of operating stuffed instructions on one, two, or more threads of a multi-threaded digital signal processor. Moreover, no instruction stuffing process or mechanism is known that allows a debugging process to execute instructions on the core processor in conjunction with or in association with both the core processing functions and the non-intrusive debugging process.

Reasons for which instruction stuffing operations may be advantageous include for the purpose of reading and/or writing core registers and memory. Also, debugging process operations may be abstracted for user analysis, including the use of various analytical application programs. Moreover, instruction operations may allow a user to enter into the debugging process various instructions applicable to a specific type of debugging.

There is a need, therefore, for a debugging process and system for operation with a DSP, which debugging process and system provides the ability for instruction stuffing operations during non-intrusive digital signal processor debugging operations.

A need exists for an instruction stuffing process and mechanism that may be applicable to multi-threaded digital signal processor debugging operations.

A need exists for an instruction stuffing process and mechanism that may be thread-selective, by providing the ability operate stuffed instructions on one, two, or more threads of a multi-threaded digital signal processor.

Still a need exists for an instruction stuffing process or mechanism that allows a debugging process to execute instructions on the core processor in conjunction with or in association with both the core processing functions and the non-intrusive debugging process.

Also, a need exists for a non-intrusive software debugging process instruction stuffing operations for processing instructions and data on a core process during non-intrusive digital signal processor debugging operations.

SUMMARY

Techniques for providing non-intrusive, thread-selective, debugging method and system for a digital signal processor, including a multi-threaded digital signal processor, are disclosed, which techniques provide for instruction stuffing operations during non-intrusive debugging operations. The method and system here disclosed improve both the operation of a digital signal processor and the efficient use of digital signal processor instructions for increasingly powerful software applications, including applications operating in personal computers, personal digital assistants, wireless handsets, and similar electronic devices, as well as increasing the associated digital processor speed and service quality.

According to one aspect of the disclosed subject matter, a method and system for stuffing instructions in a processing pipeline of a multi-threaded digital signal processor provide for improved software instruction debugging operations. The method and system provide for operating a core processor process within a core processor associated with the digital signal processor and a debugging process within a debugging mechanism of the digital signal processor. The debugging mechanism is associated with the core processor. The disclosed subject matter includes writing a stuff instruction into a debugging process registry associated with the debugging process and a stuff command in a debugging process command register associated with the debugging process registry in response to the stuff instruction. The stuff command provides for identification of a predetermined thread of the multi-threaded digital signal processor in which to execute the stuff instruction. The present disclosure issues a debugging process control resume command from the core processor during a predetermined stage of executing on the predetermined thread and directs the core processor to perform the stuffed instruction during the debugging process. The present disclosure provides the stuffed instruction to the core processor for executing the stuffed instruction in association with the core processor process and the debugging process.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGURES and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter may become more apparent from the detailed description set forth below when taken in conjunction with the drawings in which like reference characters identify correspondingly throughout and wherein.

Figure 3:
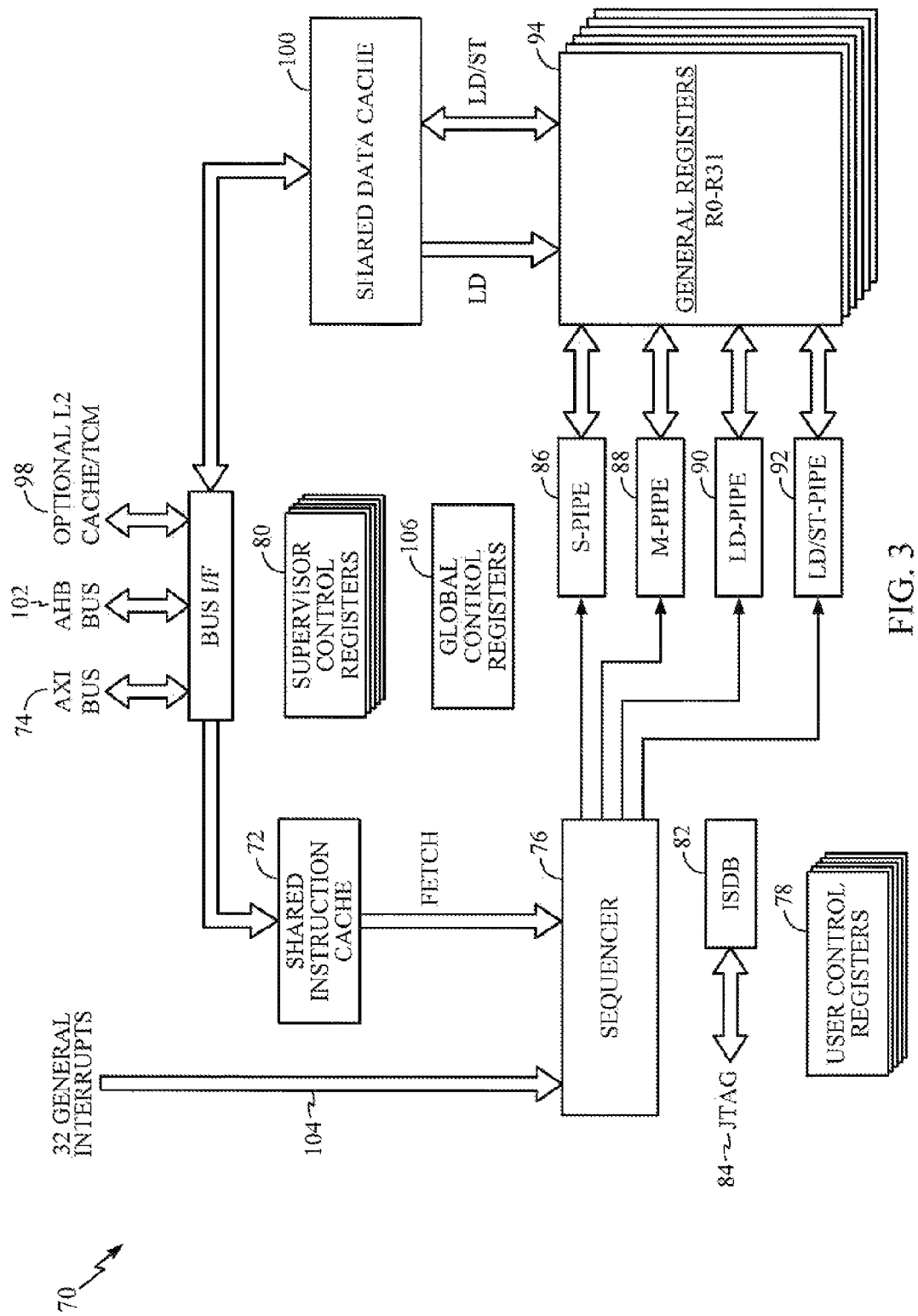
Figure 4:
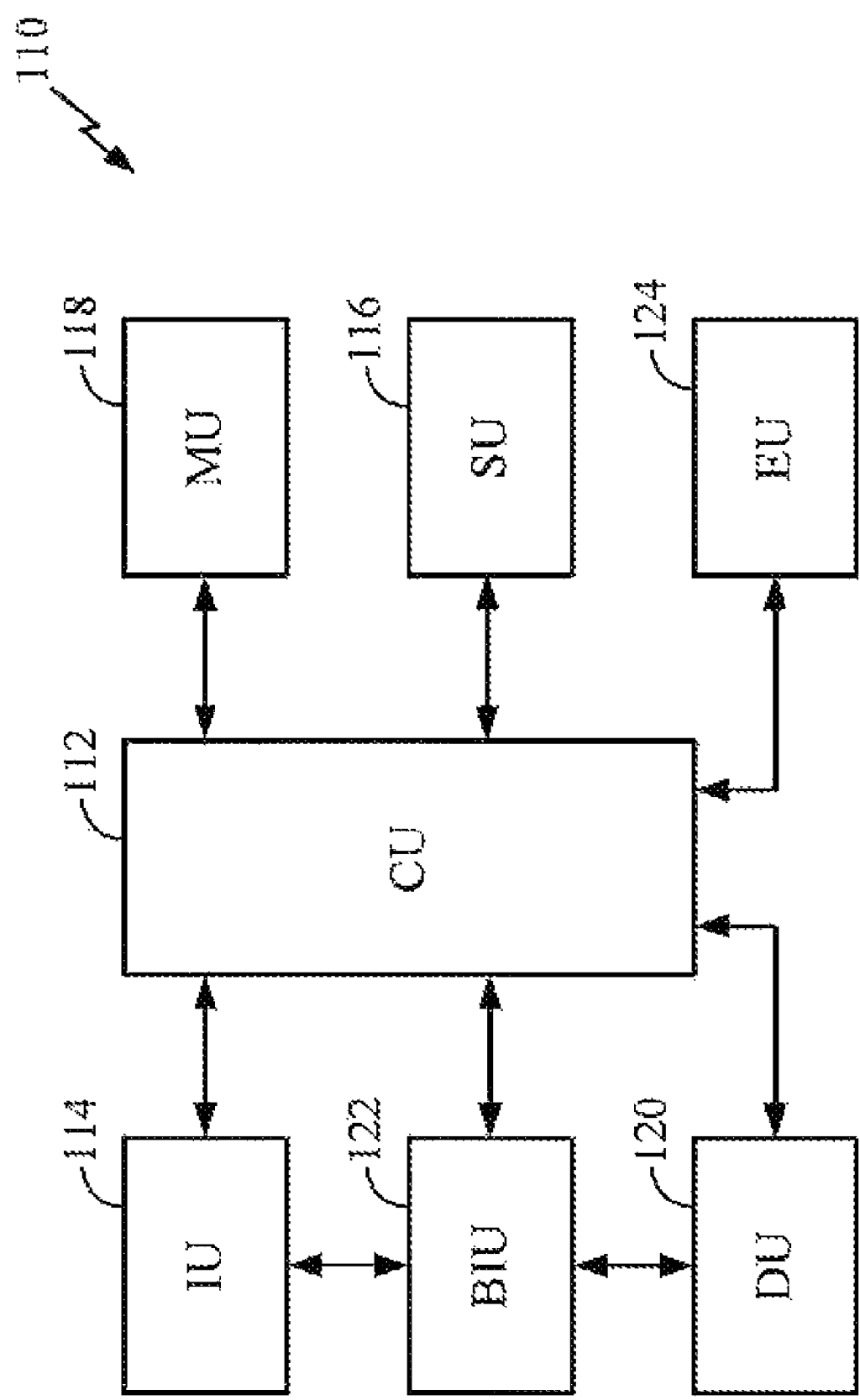
Figure 5:
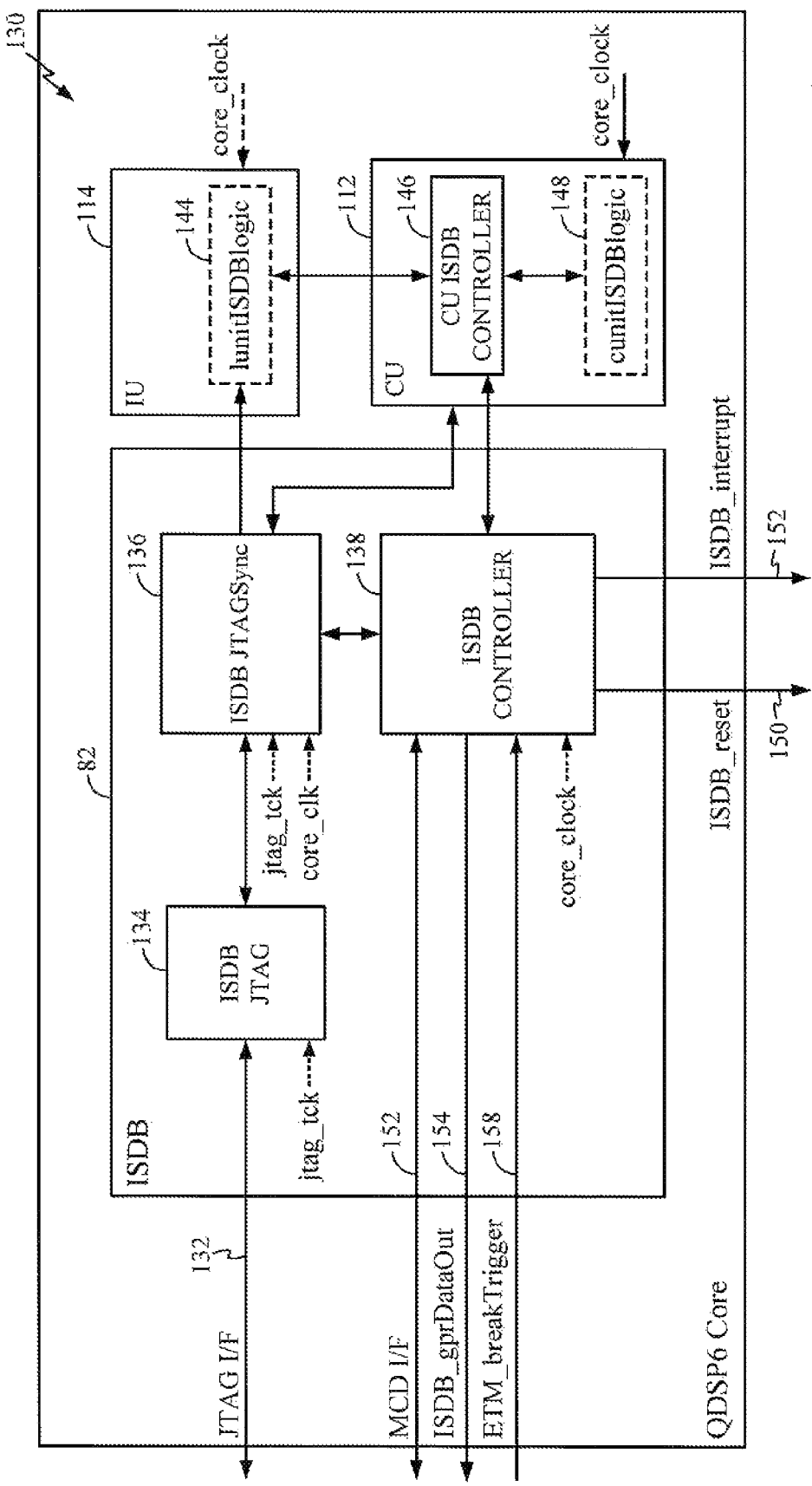
Figure 6:
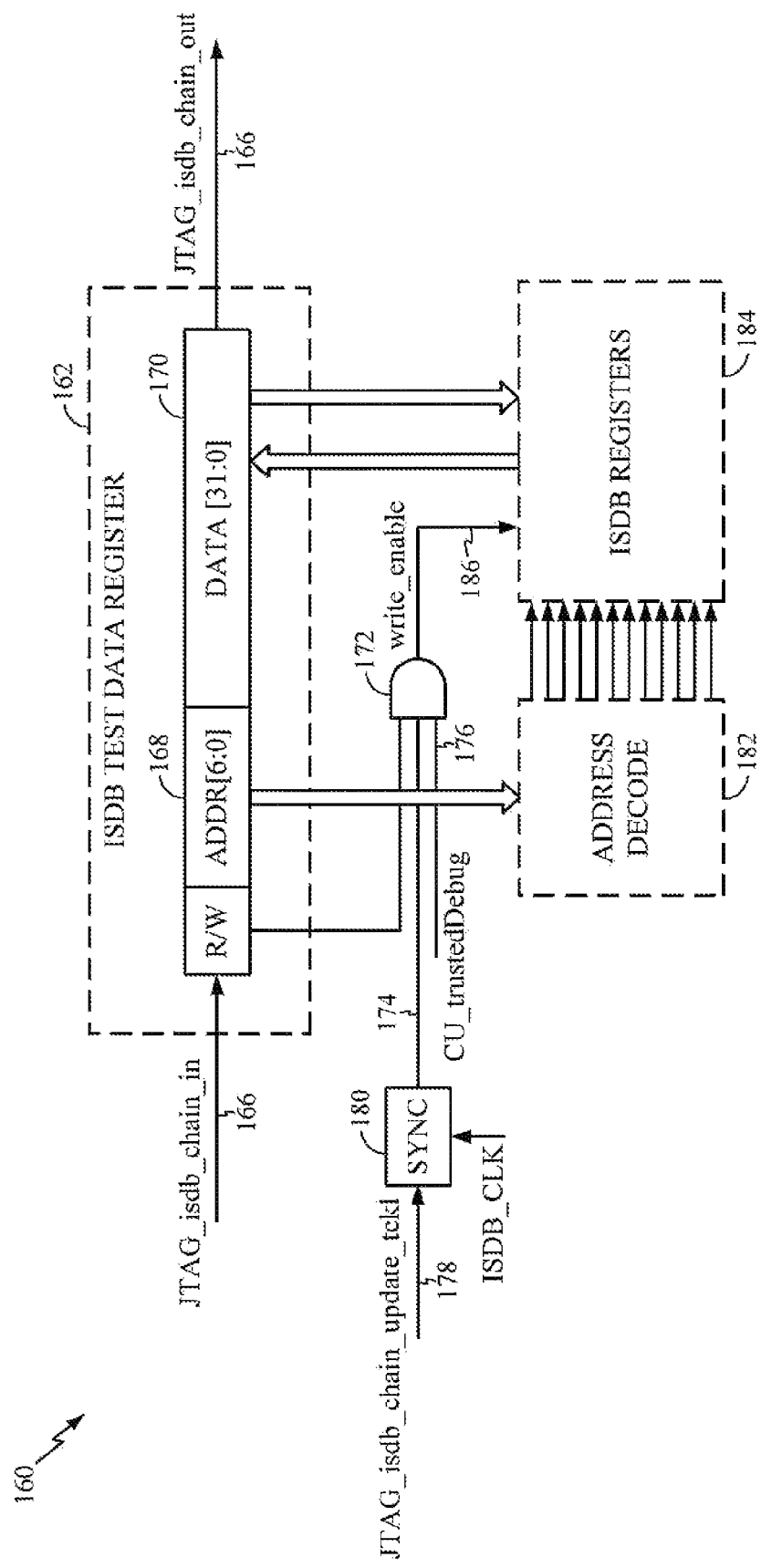
Figure 7:
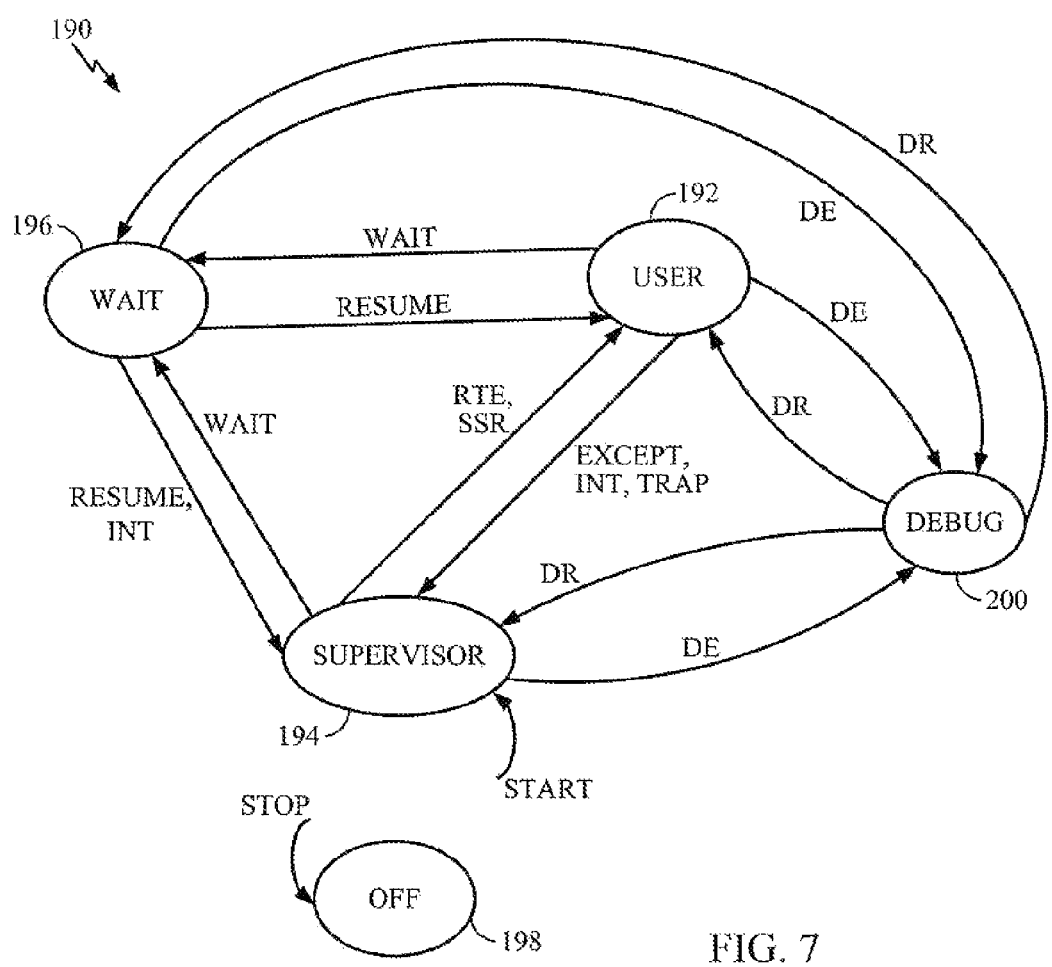
Figure 8:
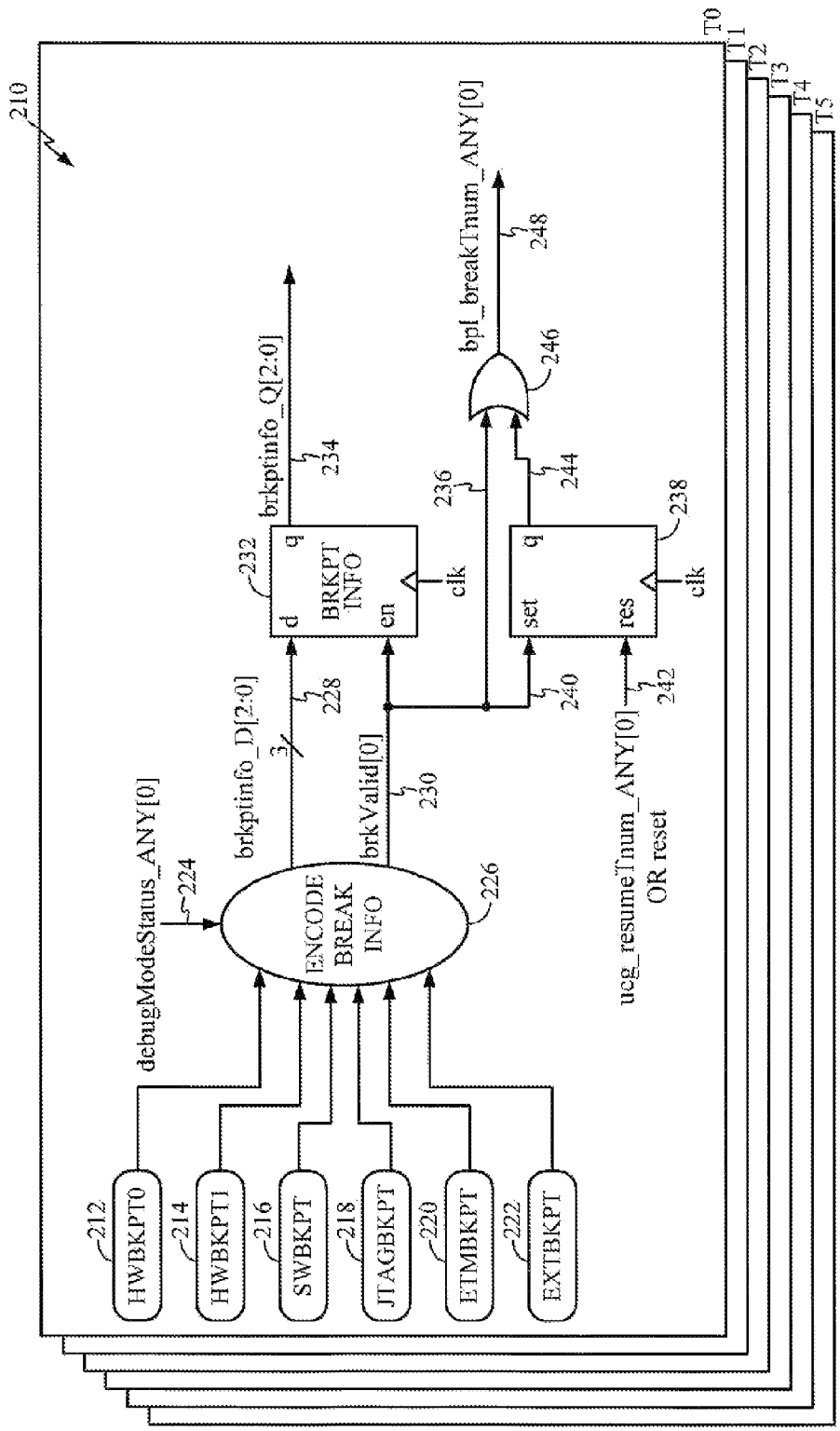
Figure 10:
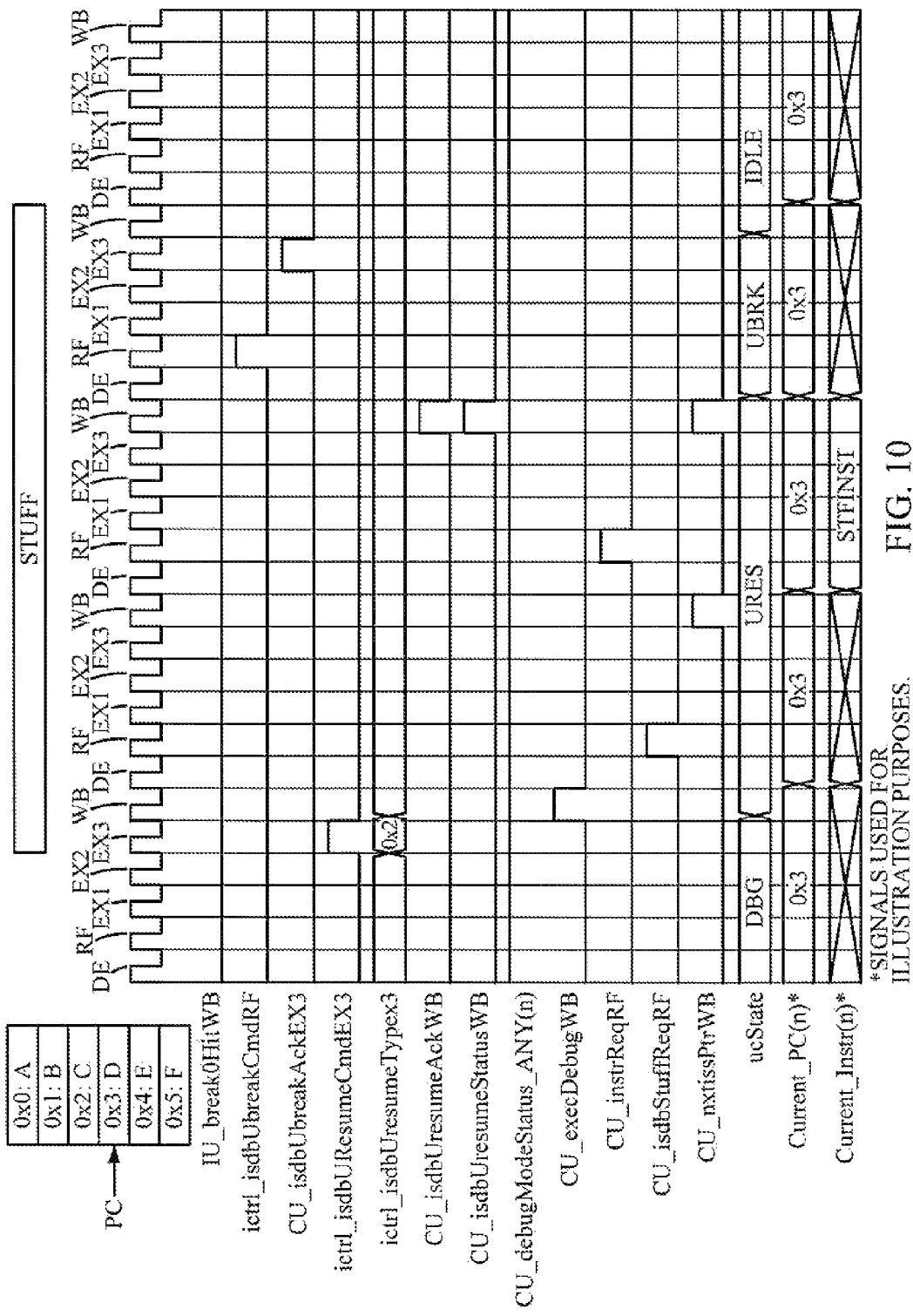

FIG. 3 provides an architecture block diagram of one embodiment of a multi-threaded digital signal processor;

FIG. 4 shows further an architectural diagram of the process flows for the control unit, the instruction unit, and other functional components of the present digital signal processor;

FIG. 5 discloses certain aspects of a digital signal processor core applying the ISDB/JTAG interface features of the present disclosure;

FIG. 6 shows an aspect of an ISDB JTAGSync circuit for performing certain aspects of the debugging procedures here disclosed;

FIG. 7 presents a process flow diagram applicable to the operating modes of the digital signal processor, including the debugging mode of operation to which the present disclosure pertains;

FIG. 8 depicts a breakpoint processing scheme applicable to the embodiment of the present disclosure;

FIG. 9 illustrates the ISDB command register contents for one embodiment of the disclosed subject matter, including an instruction stuffing register for disclosing the disclosed process; and FIG. 10 presents a processing timing cycle chart for depicting the disclosed process for instruction stuffing in association with a non-intrusive debugging process.

DETAILED DESCRIPTION OF THE SPECIFIC EMBODIMENTS

Figure 1:
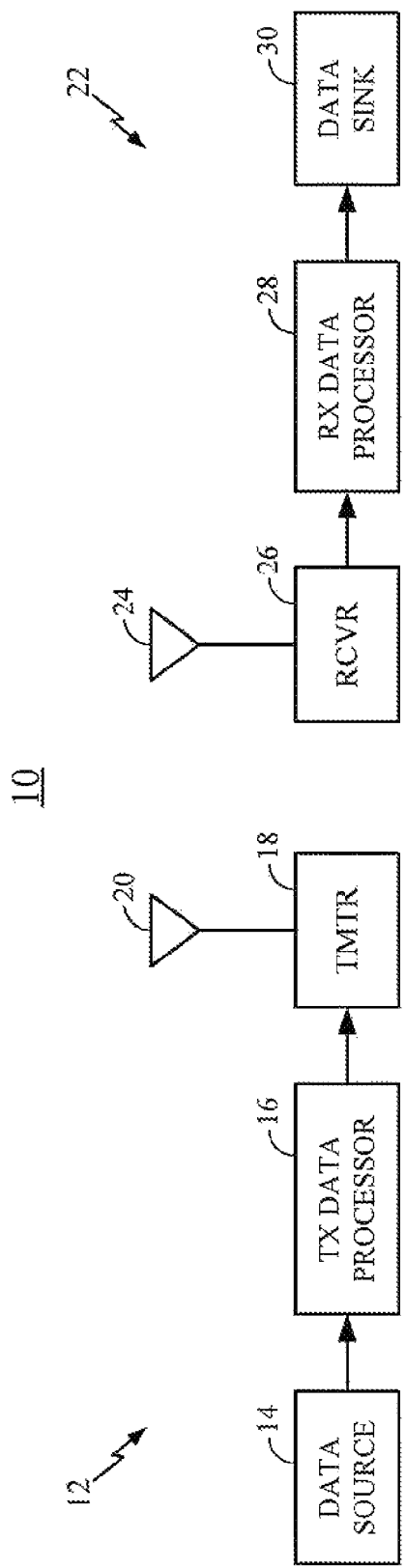
FIG. 1 is a simplified block diagram of a communications system that may implement one of the various embodiments here disclosed.

The disclosed subject matter for a non-intrusive, thread-selective, debugging method and system for a multi-threaded digital signal processor has application for multi-threaded processing of any type for which the benefits here presented may be advantageous. One application appears in telecommunications and, in particular, in wireless handsets that employ one or more digital signal processing circuits. For explaining how a wireless handset may be used, FIG. 1 provides a simplified block diagram of a communications system 10 that may implement the presented embodiments of the disclosed interrupt processing method and system. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 may be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA Standard.

Figure 2:
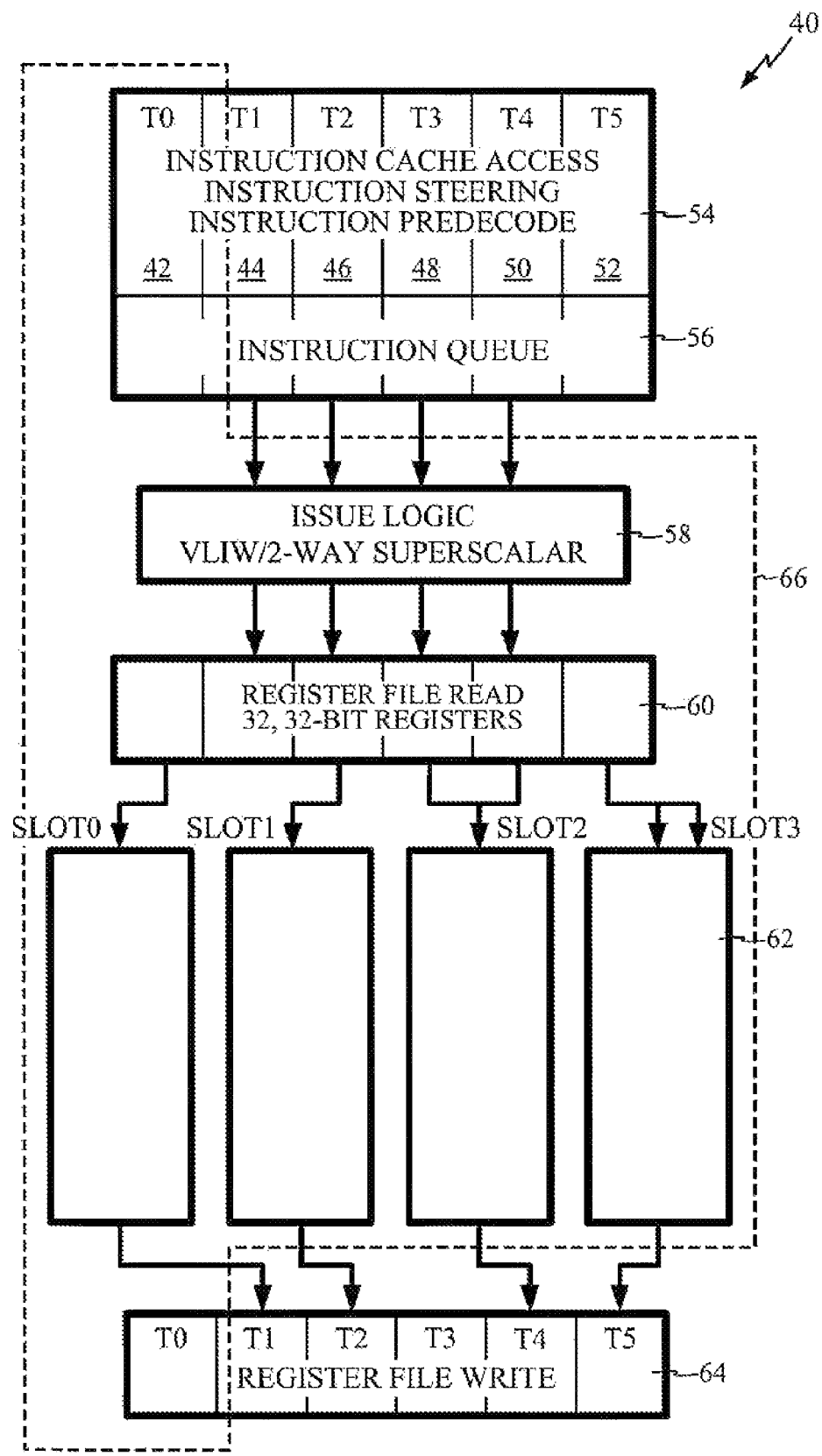
FIG. 2 illustrates a DSP architecture for carrying forth the teachings of the present disclosure.

FIG. 2 illustrates DSP 40 architecture that may serve as the transmit data processor 16 and receive data processor 28 of FIG. 1. We emphasize that DSP 40 only represents one embodiment among a great many of possible digital signal processor embodiments that may effectively use the teachings and concepts here presented. In DSP 40, therefore, threads T0:T5 (reference numerals 42 through 52), contain sets of instructions from different threads. Circuit 54 represents the instruction access mechanism and is used for fetching instructions for threads T0:T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of a selected thread is read and read data is sent to execution data paths 62 for SLOT0:SLOT3. SLOT0:SLOT3, in this example, provide for the packet grouping combination employed in the present embodiment.

Output from execution data paths 62 goes to register file write circuit 64, also configured to accommodate individual threads T0:T5, for returning the results from the operations of DSP 40. Thus, the data path from circuit 54 and before to register file write circuit 64 forms a processing pipeline 66. The present embodiment may employ a hybrid of a heterogeneous element processor (HEP) system using a single processor with up to six threads, T0:T5. Processor pipeline 66 has six stages, which matches the minimum number of processor cycles necessary to fetch a data item from circuit 54 to registers 60 and 64. DSP 40 concurrently executes instructions of different threads T0:T5 within a processor pipeline 66. That is, DSP 40 provides six independent program counters, an internal tagging mechanism to distinguish instructions of threads T0:T5 within processor pipeline 66, and a mechanism that triggers a thread switch. Thread-switch overhead varies from zero to only a few cycles.

DSP 40, therefore, provides a general-purpose digital signal processor designed for high-performance and low-power across a wide variety of signal, image, and video processing applications. FIG. 3 provides a brief overview of the DSP 40 architecture, including some aspects of the associated instruction set architecture for one manifestation of the disclosed subject matter. Implementations of the DSP 40 architecture support interleaved multithreading (IMT). In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on. Moreover, the DSP 40 may include variations of IMT, such as those variations and novel approaches disclosed in the commonly-assigned U.S. patent applications by M. Ahmed, et al, and entitled "Variable Interleaved Multi-threaded Processor Method and System" and "Method and System for Variable Thread Allocation and Switching in a Multi-threaded Processor."

FIG. 3, in particular, provides a core processing architecture 70 block diagram for DSP 40 as applied to a single thread that may employ the teachings of the disclosed subject matter. Block diagram 70 depicts shared instruction cache 72 which receives instructions via Bus interface (I/F) 73 from AXI Bus 74, which instructions include mixed 16-bit and 32-bit instructions. These instructions reach to sequencer 76, user control register 78, and supervisor control register 80 of threads T0:T5. The core-level system architecture of the disclosed subject matter also includes in-silicon debugging system (ISDB) 82, which interfaces core processor 70 via JTAG interface 84, both of which are described in more detail below.

Sequencer 76 provides hybrid two-way superscalar instructions and four-way VLIW instructions to S-Pipe unit 86, M-Pipe unit 88, LD[Load]-Pipe 90, and LD/ST[Store]-Pipe unit 92, all of which communicate with general registers 94. AXI Bus 74 also communicates via Bus I/F 73 with shared data cache 96 LD/ST instructions to threads T0:T5. Optional L2 Cache/TCM 98 signals include LD/ST instructions with shared data TCM 100, which LD/ST instructions further flow to threads General Registers 94. From AHB peripheral bus 102 MSM specific controller 104 communicates interrupts with T0:T5, including interrupt controller instructions, debugging instructions, and timing instructions. Global control registers 106 communicates control register instructions with threads T0:T5.

DSP 40, therefore, includes six virtual DSP cores, each containing global control registers 106 and private supervisor control registers 80. Global control registers 106 are shared between all threads. Each thread shares a common data cache and a common instruction cache. Load, store, and fetch operations are serviced by a common bus interface. High performance AXI bus 74 and a lower performance AHB bus 102 are used to connect the data and instruction traffic to off-core memory and peripherals. An integrated level two memory (cache and/or TCM) input 98 is optional. Peripheral access may be through memory-mapped loads and stores. The physical address partition between AHB and AXI may be configured at the MSM level.

Clearly, the presented architecture for DSP 40 may evolve and change over time. For example, the number of instruction caches that DSP 40 may use could change from six to one, or other numbers of caches. Superscalar dispatch, L1 data at TCM 100, and other architectural aspects may change. However, the present subject matter may have continued relevance in a wide variety of configurations and for a large family of modifications of DSP 40.

ISDB 82, through JTAG interface 84, provides a hardware debugging process for DSP 40. ISDB 82 provides software debug features through JTAG interface 84 by sharing system or supervisor-only registers, that are divided into supervisor control registers 80 on a per thread basis, as well as global control registers 106 between all threads. The system control registers are used for per thread interrupt and exception control and per thread memory management activities. Global registers allow interacting with the ISDB 82 for debugging operations.

ISDB 82 enables software developers to debug their software while DSP 40 operates. ISDB 82 hardware, in combination with a software debugging process program operating in ISDB 82, may be used to debug the DSP 40 operating system software. ISDB 82 supports debugging hardware threads individually. Users may suspend thread execution, view and alter thread registers, view and alter instruction and data memory, single step threads, stuff instructions to threads, and resume thread execution.

ISDB 82 may interface with a debugging process interface card to communicate with ISDB 82 debugging software residing on a program counter, yet all through JTAG interface 84. Host debugging process software may interact with the ISDB 82 by reading and writing ISDB control registers. Communication, for example, may be through a 40-bit packet which identifies the ISDB register to which read/write is to occur, as well as a 32-bit data payload. A packet format supporting this operation may be up to 64 control registers which may be 32 bits wide each.

FIG. 4 presents a diagram of the micro-architecture 110 for DSP 40 including control unit (CU) 112, which performs many of the control functions for processor pipeline 46. CU 112 schedules and issues instructions to three execution units, shift-type unit (SU) 116, multiply-type unit (MU) 118, and load/store unit (DU) 120. CU 112 also performs superscalar dependency checks. Bus interface unit (BIU 114) 122 interfaces IU 114 and DU 120 to a system bus (not shown). SLOT0 and SLOT1 pipelines are in DU 120, SLOT2 is in MU 118, and SLOT3 is in SU 116. CU 112 provides source operands and control buses to pipelines SLOT0:SLOT3 and handles GRF and CRF file updates. CU 112 accepts external inputs such as interrupts and reset, and supports ISDB/ETM 122. CU 112 also handles exceptions due to protection violations occurring during address translations.

ISDB 82 interfaces with three domains: host debugging software through JTAG 84, DSP 40 core through IU 114 and CU 112, and other cores present in the system through a Multi-Core Debug (MCD) signal interface. The primary interface between the host debugging software and DSP 40 core is a set of JTAG accessible registers referred to as ISDB 82 registers. The host debugging software performs various debugging process tasks by executing a sequence of ISDB 82 register reads and writes.

ISDB 82 communicates with the test environment (in this case a POD or debugging process interface card communicating with the debugging process software residing on a PC) through JTAG interface 84. The host debugging process software interacts with the ISDB by reading and writing ISDB control registers. Communication occurs through a 40-bit packet which identifies the ISDB register in which to read and/of write and a 32-bit data payload for the various ISDB command, including the present instruction stuffing process.

FIG. 5 shows important aspects of ISDB/JTAG interface 110 between the debugging mechanism and the core processor of the disclosed subject matter. In association with DSP 40 core architecture 70, ISDB 82 communicates with JTAG 84 via path JTAG interface path 112, from ISDB JTAG circuit 114. ISDB JTAG circuit 114 processes data flows between JTAG 84 and ISDB 82. ISDB JTAG circuit 114 further interfaces ISDB JTAGSync circuit 116. ISDB JTAGSync circuit 116 communicates further with ISDB controller 118, IU 114 and CU 112. Particularly, ISDB JTAGSync circuit 136 interfaces IU 114, ISDB logic circuit 144, and CU ISDB Controller 146 of CU 112. CU ISDB controller 146 communicates with CU ISDB logic circuit 148, as well as ISDB controller 138. Control outputs from ISDB controller 138 include ISDB data output 154, ISDB reset signal 150, and ISDB interrupt 152. Further interfaces to ISDB controller 138 include MCD interface 156 and ETM break trigger 158.

ISDB 82 provides hookups for multi-core debug at the MSM level through MCD interface 156. The MCD interface 156 consists of a pair of input signals which trigger break or resume of core processor 70 and a pair of output signals which indicate that core processor 70 is entering a debugging process or resuming program execution. The MCD break triggers may follow an edge-based protocol such that when a rising edge is detected on an external breakpoint trigger, the threads indicated in external breakpoint thread number mask suspend execution and enter debug mode. Similarly, when a rising edge is detected on the MCD external resume trigger, the threads indicated in external resume thread number mask, if in debug mode, resume normal program execution.

ISDB 82 control logic is spread across two blocks: ISDB controller 138 in ISDB 82 and CU ISDB controller 146 in CU 112. ISDB controller 138 handles the tasks of implementing ISDB enable, ISDB version, and ISDB general purpose register registers. MCD external break and resume triggers 156 and ETM break trigger 158 are synchronized to the core processor 70 clock before they are forwarded to CU 112 for further processing. ISDB controller 138 also generates MCD break trigger and the MCD resume trigger based on debug mode status of core processor 70. ISDB controller 138 adds a pipeline stage for signals sent out to DSP 40, such as an ISDB interrupt, break event, and other signals. The rest of the control logic which includes breakpoint processing, micro-command generator, mailbox and status logic is handled by CU ISDB controller 146.

CU 112 includes circuitry and instructions capable of handling the tasks such as (a) processing breakpoints and generating break triggers to each thread; (b) generating micro-break and micro-resume commands; (c) maintaining ISDB 82 status and mailbox registers; and (d) implementing the certain ISDB 82 registers. CU 112 includes a breakpoint processing logic (BPL) block as appears in FIG. 8 for processing all the breakpoints and generating a macro break request to a micro-command generator of CU ISDB controller 126. The micro-command generator processes the macro break request along with instruction stuff commands, instruction step and resume commands and issues micro-break and resume commands to CU 112 for pipeline control.

CU ISDB controller 128 maintains the state of ISDB 82 based on the break and resume acknowledge signals received back. The mailbox functions of CU ISDB controller 146 maintain mailbox registers used for communication between the host debug software and the DSP 40 core processor. These mailbox functions also contain ISDB 82 status registers.

To demonstrate illustrative circuitry for performing the presently disclosed instruction stuffing operations in association with non-intrusive debugging operations, FIG. 6 includes ISDB JTAGSync circuit 160. ISDB JTAGSync circuit 160 includes an ISDB test data register 162 which DSP 40 may use to read and write the ISDB control registers. ISDB JTAGSync circuit 160 provides the synchronization logic between the ISDB test data register 162 operating on DB_tck and the ISDB control registers 164 operating in the DSP 40 clock domain. By reading and writing the ISDB control registers, DSP 40 performs various debugging process tasks as may be supported by the ISDB 82, including the presently disclosed instruction stuffing operations.

In the implementation of FIG. 6, ISDB JTAGSync circuit 160 receives JTAG_isdb_chain_in signal 164 into ISDB Test Data Register 204 to generate JTAG_isdb_chain_out signal 166. ISDB Test Data Register 162 includes read/write (R/W) bits 167, Address bits [6:0] 168, and Data bits [31:0] 170. Values in R/W bits 167 go to AND gate 172, as do Sync circuit output 174 and CU 112_trustedDebug input 176. JTAG_isdb_chain_update_tkl signal 178 and ISDB_CLK signal 180 control the operation of Sync circuit 174. Address information from Address bits 168 may be received by Address Decode circuit 176, which feeds ISDB Registers 184. ISDB Registers 184 transfer data with Data bits [31:0] in response to a write enable signal 186 from AND gate 172.

ISDB JTAGSync circuit 130 acts as the synchronization bridge between the TAP controller running on JTAG TCK in DB_JTAG block and ISDB registers 184 running on DSP 40 core clock distributed in ISDB controller 138, CU 112_ISD-BCtrl 146 and IU 114. The ISDB controller 138 and CU ISDB controller 146 contain the control logic of ISDB 82 which consists of a micro-command generator, breakpoint processing logic and various ISDB registers 184 (configuration, mailbox, command etc.). These blocks execute different debugging process tasks initiated by host debugging software on the DSP 40 core. The ISDB interrupt signal is sent out to the DSP subsystem where it is merged with other interrupt sources and sent back to the DSP core 70. Similarly an ISDB 82 reset is merged with other reset sources (power-on reset, software reset etc.) to trigger a reset to the core. ISDB 82 interfaces with external systems (e.g., an MSM system external to DSP 40) through an MCD signal interface. Two pairs of break and resume triggers are provided to support simultaneous debugging of DSP 40 and other cores in external system.

FIG. 7 presents a processing mode diagram 190 for the various mode control aspects of DSP 40, including operations of ISDB 82 during debugging processes. In FIG. 7, DSP 40 supports processing modes that are both global to all threads and local to individual threads. Each DSP 40 hardware thread individually supports two execution modes, USER mode 192 and SUPERVISOR mode 194, and three non-processing modes of WAIT mode 196, OFF mode 198, and DEBUG mode 200, all as may appear in FIG. 7. The mode of a thread is independent of other threads, for example one thread may be in WAIT mode 196 while another is in USER mode 192, and so on.

The per-thread mode state diagram of FIG. 7 is supported by various instructions or events. These include "Except" or internal exception event, an "Int" or external interrupt event, an "RTE" or software return instruction from exception mode, and "SSR" or update to SSR register instruction, a "Stop" or software stop instruction that may be entered from any mode, a "Start" or software Start Instruction that also may be entered from any mode, a "trap" or software Trap Instruction, a "Wait" or software wait Instruction, a "Resume" or software Resume Instruction, a "DE" or Debug Event, and a "DR" or Debug Instruction. While the functions in different implementations of the claimed subject matter may vary slightly from those here presented, the meanings of "Start," "Wait," "Resume," "DE," and/or "DR" may be given their broadest interpretations consistent with the scope of the claimed subject matter.

Registers are available in DSP 40 in both USER mode 192 and SUPERVISOR mode 194. The user-mode registers are divided into a set of general registers and a set of control registers. General registers are used for all general purpose computation including address generation, scalar and vector arithmetic. Control registers support special-purpose functionality such as hardware loops, predicates, etc. General purpose registers are 32 bits wide and may be accessed as single registers or as aligned pairs of two registers. The general register file provides all operands for instructions, including addresses for load/store, data operands for numeric instructions, and vector operands for vector instructions.

DEBUG mode 200 provides a special state where the thread is waiting for commands from ISDB 82. Whenever an ISDB Debug Event occurs, such as by the execution of a software breakpoint instruction, a break command from ISDB 82, or occurrence of a hardware breakpoint, indicated threads may enter DEBUG mode 200. While in DEBUG mode 200, the core is controlled by ISDB 82 via commands from JTAG interface 84. When the ISDB 82 releases the thread due to execution of a resume command, the thread may resume operation according to their current mode settings. When a thread is in DEBUG mode 200, it is controlled by ISDB 82 and cannot be controlled by other threads. Such control may include the execution of various instructions as may be provided through the presently disclosed instruction stuffing operations. A Wait, Resume, Start, or Stop instruction from a running thread, targeting a thread in DEBUG mode 200, may be ignored. Similarly, a Non-Maskable Interrupt (NMI) may be ignored by threads in DEBUG mode 200.

A HARDWARE RESET mode (not shown in FIG. 7) and DEBUG mode 200 are global to all threads. Whenever the hardware reset pin is asserted, regardless of any thread's processing state, DSP 40 may enter HARDWARE RESET Mode. In HARDWARE RESET mode, all registers are set to their reset values. No processing may occur until the hardware reset pin is de-asserted. When the reset pin is asserted, the processor may transition into reset mode and all registers may be reset to their HARDWARE RESET values. After the reset pin is de-asserted, thread T0 may be given a soft reset interrupt. This may cause thread T0 to enter SUPERVISOR mode 194 and begin executing at the reset vector location. All other threads may remain off. At this point, the software is free to control mode transitions for each thread individually.

In FIG. 8, it is seen that BPL circuit 210 of CU ISDB controller 146 includes break triggers from six different sources, including hardware breakpoints 0/1 (HWBKPT0 212 and HWBKPT1 214), software breakpoint (SWBKPT 216), JTAG interface 84 breakpoint (JTAGBKPT 218), ETM (embedded trace macro) breakpoint (ETMBKPT 220), and external breakpoint (EXTBKPT 222). Break trigger 212 through 222 and debug mode status input 214 go to encode break encoder 216 to cause DSP 40 to operate in DEBUG mode 200. Output from encoder 226 includes three (3) breakpoint information bits 228 and a breakpoint valid bit 230. Breakpoint information data 228 enters breakpoint information circuit 232 to cause a breakpoint information JTAG interface command 234. Breakpoint bit 230 also generates OR gate input 236 and reset circuit 238 input. Reset circuit 238 receives either a UCG resume thread number or a reset input 242 to generate reset control output 244 into OR gate 246. Either valid bit 236 or reset output 244 may cause OR gate 246 to generate BPL breakpoint output 248.

The break triggers in BPL circuit 210 are processed along with the corresponding thread number mask to generate macro break trigger to each of the threads. The macro break trigger 248, bpl_breakTnum_ANY[0], is maintained until the corresponding thread is resumed. The number of pipeline stages that may be used in BPL circuit 210 is driven by hardware breakpoints which are precise breakpoints, i.e., the instruction that triggers hardware breakpoint match must not be executed. The thread switches to debug mode after executing the program until that instruction. The disclosed embodiment provides a macro break trigger one cycle after the break triggers arrive. For that reason the breakValid input 226 is logically OR'ed with its latched version input 242 to generate bpl_breakTnum_ANY[0] output 248.

Through the use of breakpoints, the six threads of DSP 40 may individually enter and exit DEBUG mode 200. A breakpoint trigger may come from five sources which correspond to the five different types of breakpoints supported in ISDB 82. Upon hitting a breakpoint, a thread transitions from its current mode (e.g., WAIT/RUN) to DEBUG mode 200. In DEBUG mode 200, the thread waits for commands from ISDB 82. A thread in OFF mode 198 is powered down and may not accept any commands from ISDB 82. The latency of entering DEBUG mode 200 is implementation defined, such as in the present disclosure as relating to the event a power collapse. For example, an implementation may choose to complete a given operation, for example finish an outstanding load request, before entering DEBUG mode 200. In one embodiment, a thread identifier register contains an 8-bit read/write field and is used for holding a software thread identifier. This field is used by the hardware debugging process to match breakpoints.

ISDB 82, therefore, has four operations: break, resume, stuff instruction, single step. From the micro-architecture point of view, there are two basic operations: break and resume. The micro-break command and micro-resume command to refer to operations of break, stuff instruction and single step. For example, the stuff instruction operation may be viewed as a micro-break command followed by micro-resume command after the stuff instruction operations. Breakpoint operations may be triggered from five sources, as herein described. Each break source may break multiple threads as specified in its corresponding tread number mask value.

FIG. 9 illustrates the ISDB command register contents for one embodiment of the disclosed subject matter. These ISDB control registers may be used by the host system to configure ISDB 82 to perform different debugging process tasks and communicate with the processor. These registers are accessible through the JTAG interface. The ISDB status register (ISDBST) indicates the current status of ISDB, including the stuff command status bits for which a "0" values indicates a stuff instruction is successful, whereas a "1" value indicates the stuff instruction caused an exception. The host system may use the ISDB configuration registers 0 and 1 (ISDB-CFG0, ISDBCFG1) register to enable or disable various features of the ISDB 82. The breakpoint info register (BRKPT-INF0) indicates, for the threads in debug mode, which trigger caused the breakpoint. The breakpoint PC register 0 and 1 (BRKPTPC0, BRKPTPC1) is identical to BRKPTPC0, control hardware breakpoint 0 and 1, respectively. The breakpoint configuration registers (BRKPTCFG0 and BRKPTCFG1) are used to configure breakpoint 0 and 1, respectively. The stuff instruction register (STFINST) allows for a 32-bit stuff instruction. The ISDB mail box registers (ISDBMBXIN and ISDBMBXOUT) are used to exchange data between the ISDB and core processor 70. The ISDB command register (ISDBCMD) is used by DSP 40 to issue various commands to the ISDB 82. This ISDB enable register (ISDBEN) enables ISDB operations and allows checking the status of the "security" ISDB enable bit and the ISDB clock. The ISDB version register (ISDBVER) reads the version of the ISDB design present in the chip. ISDB general purpose register (ISDBGPR) provides storage for general functions associated with ISDB 82.

The ISDB command register provides, in the disclosed embodiment, a 32-bit register whose value is output into DSP 40. The ISDB command register may be used to control external hardware, and in an MSM-specific manner. The ISDB control registers are accessed by the debugging process host software via JTAG interface 84 and are distributed across three units: ISDB 82, IU 114 and CU 112. Instead of placing all the registers in ISDB 82, the registers are placed locally in the unit where the register values are used primarily.

The ISDB registers of FIG. 9 are distributed among ISDB 82, IU 114 and CU 112 the following way: ISDB 82 includes the ISDB enable register; ISDB version register; and ISDB general purpose register. The CU 112, wherein are the ISDB control mailbox, breakpoint logic, and micro-command generator blocks, includes ISDB configuration registers (ISDB-CFG0 & ISDBCFG1), the command register (ISDBCMD), breakpoint configuration registers (BRKPTCFG0 & BRKPTCFG1), breakpoint information register (BRKPT-INF0), breakpoint status register (ISDBST), breakpoint mailbox in register (ISDBMBXIN, ISDBMBXOUT). The IU 114 112 register block includes breakpoint command registers (BRKPTPC0, BRKPTPC1), breakpoint configuration registers (BRKPTCFG0, BRKPTCFG1), and, as is relevant to the present disclosure, the stuff instruction register (STFINST).

Instruction stuffing, as here disclosed, provides a method and system for ISDB 82 to execute instructions on the core. Instructions are stuffed for various reasons. These may include for the reasons of reading and/or writing core registers and memory, as well as for debugging process operations abstracted for the user and user-entered instructions. To stuff an instruction, the user first programs the STFINST register of the ISDB command register with the 32-bit instruction to be executed. The ISDB command register is then written, beginning with setting the command field to the STUFF code. Then, the process sets the thread number field to the thread to receive the instruction. Preferably, one bit in the thread number field may be set. The selected thread must be in DEBUG mode 200 before the instruction may be stuffed. If more than one bit in thread number is set or the selected thread is not in debug mode, the results are undefined. Then, the instruction stuffing process includes setting the privilege level of the stuffed instructions (either for use in USER mode 192 or SUPERVISOR mode 194). After issuing the STUFF command, the instruction may be executed on the chosen thread with the chosen privilege level. During instruction stuffing, the program counter (PC) does not advance. Stuffed instructions which use the PC for branches, or instructions that cause an exception may use the current PC value for the thread on which the stuffed instructions execute.

In the case that a stuffed instruction causes an exception, the ISDB status register, ISDBST, may indicate that an exception occurred. The thread may remain in debug mode. The architected registers for the specific may reflect the exception state. For example, if a LOAD instruction is stuffed that causes a TLB miss exception, then an exception register (ELR) may be set to the current PC, the PC may be changed to exception vector, and a status register (SSR) may hold the correct cause code and status information. The debugging process software may query the ISDBST after stuffing an instruction that could cause an exception to see if an exception occurred. If it did, then the SSR register may be read, via stuffing a control register transfer instruction, to determine the exception cause.

Once an exception has been recognized, the debugging process has a number of choices as to how to handle the situation. For example, the debugging process may choose to program a software or hardware breakpoint at the exception return point and resume the thread in order to run the handler. Also, the debugging process could redirect a thread to an operating system "helper" function, as well as to step through the handler using a single-step function. Furthermore, the debugging process may manually fix the problem (e.g., reload the TLB). The exact strategy is left to the operating system and/or debugging process implementation.

Registers, cache, and memory may be accessed by stuffing the appropriate instruction sequences. The debugging process software may read/write thread registers by stuffing the appropriate control register transfer instruction to move data between a core register and the ISDB mailbox. This instruction may be stuffed using supervisor privilege level to ensure no exception occurs. Cache contents (data and cache tag value) may be read and/or written by stuffing the appropriate cache maintenance and load instructions.

Memory may be read/written by stuffing the appropriate LOAD/STORE instruction. When the MMU is enabled, Loads and Stores always execute using a virtual address. The MMU provides the information may be stored in a cache memory, such as signaling as cacheable, uncacheable, etc. If it is desired to access memory from a particular source, for example, to read from a device in uncached memory, then the debugging process software ensures that the MMU is properly configured for this access. For certain debug scenarios, the debugging process software may engage the help of the operating system to configure a specific scenario.

Cache contents are affected as if the stuffed instruction came from normal program flow. For example, a cacheable load that misses in the data cache may cause a line replacement. In the case that one thread is in debug mode and others are running, the cache contents may change accordingly. In the case of a load that misses in the cache or an uncached load, the stuff command may not be reported as complete in the ISDB status register until the load data returns and the operations completes normally.

To read instruction memory, a similar procedure as reading data memory may take place. To write instruction memory, for example to set software breakpoints, the debugging process software may first stuff a STORE instruction to write the instruction memory. Then, the process includes stuffing a data cache clean address instruction to force the data into external memory, stuffing a barrier instruction to ensure that the change is observable in external memory, and an instruction cache invalidate address instruction to remove the old entry from the instruction cache.

Instruction stuffing, as herein disclosed, may also be of use in association with resetting DSP 40. Note that executing an ISDB RESET command forces a hardware reset and causes the entire DSP 40, i.e., all threads, to reset. This may set all registers to initial values, power off threads T0:T5 and send a reset interrupt to thread T0. If, on the other hand, it is desired to reset just certain threads, this can be done using instruction stuffing. The steps include stuffing a "START" instruction with appropriate mask settings. This may cause a reset interrupt to be pending to the indicated threads. Then, the sequence includes executing an ISDB RESUME instruction on the desired threads. Performing such a sequence, therefore, makes possible an advantageous process of thread-selective resetting, without resetting all of DSP 40.

FIG. 10 presents a processing timing cycle chart for depicting the disclosed process for instruction stuffing in the disclosed non-intrusive debugging process. The signal behavior during a stuff operation on a particular thread, as depicted by FIG. 10, shows the sequence of events on a single thread of DSP 40. Similar behavior may be seen by each thread in their corresponding pipeline stages. The stuffed instruction is provided by writing to the STFINST register of the ISDB command registers. To execute the stuffed instruction, debug software writes to the ISDB command register with the stuff command. The command also provides the specific thread for the stuffed instruction to execute. ISDB control register 138 issues a micro-resume command in the EX3 stage of thread pipeline processing for the thread on which the stuff instruction is to execute. At this point, the CU ISDB micro-resume type EX3 register is set to "0x2." This indicates that the issued micro-resume command is to perform a stuff operation. CU 112 asserts a CU debugging exception instruction at the WB stage of the following cycle. Upon receiving the CU debugging exception instruction, IU 114 clears off the old instruction buffer state and prepares to fetch from a new location similar to regular exception.

CU 112 sends a stuff instruction request to IU 114 in the following RF stage and asserts a CU next issue pointer instruction in the WB stage. Upon receiving the CU next issue point instruction, IU 114 provides the stuffed instruction to CU 112 in a similar way as an UC instruction. It may be multiplexed with BU return data inside IU 114 once, instead of multiplexing on a per-thread basis. This feature saves multiplexing cost, as well as routes congestion over and instruction cache. The micro-resume command is associated with a side-band signal to indicate the privilege level of the stuffed instruction. This permits executing in either USER mode 192 or SUPERVISOR mode 194.

While the stuffed instruction is being executed, CU 112 sends another instruction request to IU 114 to restore the instruction buffer with the regular program instruction. When the stuffed instruction is committed, CU 112 needs to return micro-resume status in the WB processing stage, whether the resume status is success or not, along with an acknowledgement. ISDB controller 138 then issues a micro-break command in the following RF stage to prevent CU 112 from executing the next instruction. If the resume status is not success, CU 112 may instruction IU 114 to handle the exception in normal ways. Note, however, that the only reason is that the stuffed instruction causes an exception. The current program counter may be pushed to ELR and then updated to the except handler entry point. The thread may be stopped due to the micro-break command. After receiving micro-break command acknowledge, stuff instruction may be complete. Accordingly, the micro-break command status may be always success in this case.

In summary, the disclosed subject matter provides a method and system for stuffing instructions into a processing pipeline of a multi-threaded digital signal processor for improved software instruction debugging operations. The method and system provide for writing a stuff instruction into the debugging process registry. The disclosure includes writing a stuff command in a debugging process command register for executing the stuffed instruction. A predetermined thread of the multi-threaded digital signal processor in which the execution of the stuff instruction is to be executed is identified by the stuff instruction. The process and system issue a CU 112 debugging process control resume command during a predetermined stage, i.e., the EX3 stage, of executing the thread on the multi-threaded digital signal processor and set the CU 112 debugging process resume type to the predetermined stage of executing the thread for indicating that the issued resume command is to perform a stuff operation. The present disclosure also asserts a CU 112 exception command in the WB stage of following cycle and clears off the old instruction buffer state upon assertion of the CU 112 exception command. Then, the method and system prepare to fetch from a new location similar to a regular exception, while maintaining ELR notwithstanding a debugging process exception.

Also, the present embodiment sends a stuff request from the CU 112 to IU 114 in a subsequent processing stage and asserts a CU 112 next issue pointer the following cycle. The stuffed instruction is provided to the CU 112 upon receiving the CU 112 next issue pointer, whereupon IU 114 provides the stuffed instruction to CU 112 in a similar way as an UC instruction. The stuffed instruction is then multiplexed with BU return data inside the IU 114 only once, instead of on a per thread basis. The micro-resume command is associated with a side-band signal to indicate the privilege level of the stuffed instruction (execute in user/supervisor mode). While the stuffed instruction is being executed, CU 112 sends another instruction request to IU 114 to restore the instruction buffer with the regular program instruction. Then, when the stuffed instruction is committed, CU 112 needs to return micro-resume status in WB, whether the resume status is success or not, along with an acknowledgement. The CU ISDB controller then issues a micro-break command in the following RF stage to prevent CU 112 from executing the next instruction. If the resume status is not success (i.e., when the stuffed instruction causes an exception), the CU 112 may control the IU 114 to handle the exception in normal ways. Then, the current PC may be stored in the ELR register of DSP 40 and the PC may be updated to the except handler entry point. The thread may then be stopped due to the micro-break command. After receiving micro-break command acknowledge, the stuff instruction is complete.

The processing features and functions described herein for instruction stuffing operations in association with non-intrusive, thread-selective, debugging in a multi-threaded digital signal processor may be implemented in various manners. For example, not only may DSP 40 perform the above-described operations, but also the present embodiments may be implemented in an application specific integrated circuit (ASIC), a microcontroller, a digital signal processor, or other electronic circuits designed to perform the functions described herein. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method, comprising:
    writing a stuff instruction at a debugging process registry associated with a debugging process, wherein the debugging process registry is associated with a core processor of a multi-threaded processor, wherein the multi-threaded processor is configured to execute a plurality of interleaved threads on the core processor, wherein each of the plurality of interleaved threads is identified by a thread number, wherein each of the plurality of interleaved threads may be executed independently and debugged independently of others of the plurality of interleaved threads, and wherein a program counter is separately maintained for each of the plurality of interleaved threads;
    selecting a particular thread of the plurality of interleaved threads to execute the stuff instruction;
    for the particular thread, stopping a program counter at a current program counter value during execution of the stuff instruction;
    executing the stuff instruction at the particular thread of the multi-threaded processor during the debugging process; and
    issuing, from the core processor, a debugging process control resume command during execution of the stuff instruction.

2. The method of claim 1, further comprising writing a stuff command at a debugging process command register associated with the debugging process registry, wherein the stuff command includes an identification of the thread number of the particular thread of the multi-threaded processor at which to execute the stuff instruction.

3. The method of claim 1, further comprising writing a stuff command at a debugging process command register associated with the debugging process registry, wherein the stuff command includes an identification of the thread number of each of more than one of the plurality of threads of the multi-threaded processor at which to execute the stuff instruction.

4. The method of claim 1, further comprising writing the stuff instruction as a branch instruction and using the current program counter value as a counter value of the branch instruction.

5. The method of claim 1, further comprising writing the stuff instruction as one of a start instruction and a resume instruction to selectively reset the particular thread of the multi-threaded processor.

6. The method of claim 1, further comprising writing the stuff instruction as a load instruction at the debugging process registry associated with the debugging process.

7. The method of claim 1, further comprising writing the stuff instruction as a register read instruction at the debugging process registry associated with the debugging process.

8. The method of claim 1, further comprising writing the stuff instruction as one of a cache read instruction and a cache write instruction at the debugging process registry associated with the debugging process.

9. The method of claim 1, further comprising writing the stuff instruction as one of a memory read instruction and a memory write instruction at the debugging process registry associated with the debugging process.

10. The method of claim 1, further comprising receiving the stuff instruction from a source that is not directly accessed by the multi-threaded processor.

11. The method of claim 10, wherein the stuff instruction is received by a joint test action group (JTAG) interface.

12. The method of claim 1, wherein the stuff instruction is unrelated to a program being debugged by the debugging process.

13. A system comprising:
    a debugging process registry configured to receive a stuff instruction, wherein the debugging process registry is associated with a debugging process;
    circuitry configured to execute the stuff instruction at a particular thread of a multi-threaded processor during the debugging process, wherein the multi-threaded processor is configured to execute a plurality of interleaved threads, wherein each of the plurality of interleaved threads is identified by a thread number, wherein each of the plurality of interleaved threads may be executed independently of others of the plurality of interleaved threads, and wherein a program counter is separately maintained for each of the plurality of interleaved threads;
    circuitry configured to stop a program counter for the particular thread at a current program counter value during execution of the stuff instruction; and
    a core processor configured to send a debugging process control resume command during execution of the stuff instruction, wherein the core processor is associated with the debugging process registry.

14. The system of claim 13, further comprising a debugging process command register associated with the debugging process registry, wherein the debugging process command register is configured to receive a stuff command in response to the stuff instruction, wherein the stuff command includes an identification of the thread number of the particular thread of the multi-threaded processor.

15. The system of claim 13, further comprising means for writing the stuff instruction as a branch instruction and using the current program counter value as a counter value of the branch instruction.

16. The system of claim 13, further comprising means for writing the stuff instruction as one of a start instruction and a resume instruction to selectively reset the particular thread of the multi-threaded processor.

17. The system of claim 13, further comprising means for writing the stuff instruction as a load instruction at the debugging process registry associated with the debugging process.

18. The system of claim 13, further comprising means for writing the stuff instruction as a register read instruction at the debugging process registry associated with the debugging process.

19. The system of claim 13, further comprising means for writing the stuff instruction as one of a cache read instruction and a cache write instruction at the debugging process registry associated with the debugging process.

20. The system of claim 13, further comprising means for writing the stuff instruction as one of a memory read instruction and a memory write instruction at the debugging process registry associated with the debugging process.

21. The system of claim 13, further comprising means for receiving the stuff instruction from a source that is not directly accessed by the multi-threaded processor.

22. A digital signal processor comprising:
 means for writing a stuff instruction at a debugging process registry associated with a debugging process of the digital signal processor, wherein the digital signal processor includes a plurality of interleaved threads, wherein each of the plurality of interleaved threads is identified by a thread number, wherein each of the plurality of interleaved threads may be executed independently of others of the plurality of interleaved threads, and wherein a program counter is separately maintained for each of the plurality of interleaved threads;
 means for executing the stuff instruction at a particular one of the plurality of interleaved threads of the digital signal processor during the debugging process;
 means for stopping a program counter for the particular one of the plurality of interleaved threads at a current program counter value during execution of the stuff instruction; and
 means for issuing, from a core processor, a debugging process control resume command during execution of the stuff instruction, wherein the core processor is associated with the debugging process registry.

23. The digital signal processor of claim 22, further comprising means for writing, in response to the stuff instruction, a stuff command at a debugging process command register associated with the debugging process registry, wherein the stuff command includes a thread number associated with the particular one of the plurality of interleaved threads.

24. The digital signal processor of claim 22, further comprising means for writing a stuff command at a debugging process command register associated with the debugging process registry, wherein the stuff command includes a thread number associated with the particular one of the plurality of interleaved threads of the digital signal processor at which to execute the stuff instruction.

25. The digital signal processor of claim 22, further comprising means for writing the stuff instruction as a branch instruction and using the current program counter value for the branch instruction counter value.

26. The digital signal processor of claim 22, further comprising means for writing the stuff instruction as one of a start instruction and a resume instruction to selectively reset the particular one of the plurality of interleaved threads.

27. The digital signal processor of claim 22, further comprising means for writing the stuff instruction as a load instruction at the debugging process registry associated with the debugging process.

28. The digital signal processor of claim 22, further comprising means for writing the stuff instruction as a register read instruction at the debugging process registry associated with the debugging process.

29. The digital signal processor of claim 22, further comprising means for writing the stuff instruction as one of a cache read instruction and a cache write instruction at the debugging process registry associated with the debugging process.

30. The digital signal processor of claim 22, further comprising means for writing the stuff instruction as one of a memory read instruction and a memory write instruction at the debugging process registry associated with the debugging process.

31. The digital signal processor of claim 22, wherein the stuff instruction is unrelated to a program being debugged by the debugging process.

32. A computer readable non-transitory medium storing processor executable instructions that, when executed by a processor, cause the processor to:
 write a stuff instruction at a debugging process registry associated with a debugging process, wherein the debugging process registry is associated with a core processor of a multi-threaded processor, wherein the multi-threaded processor is configured to execute a plurality of interleaved threads on the core processor, wherein each of the plurality of interleaved threads is identified by a thread number, wherein each of the plurality of interleaved threads may be executed independently, and wherein a program counter is separately maintained for each of the plurality of interleaved threads; and
 execute the stuff instruction at a particular thread of the multi-threaded processor-during the debugging process, for the particular thread, stop a program counter at a current program counter value during execution of the stuff instruction; and
 issue, from the core processor, a debugging process control resume command during execution of the stuff instruction.

33. The computer readable non-transitory medium of claim 32, further comprising instructions that, when executed by the processor, cause the processor to write a stuff command at a debugging process command register associated with the debugging process registry, wherein the stuff command includes the thread number of the particular thread of the multi-threaded processor at which to execute the stuff instruction.

34. The computer readable non-transitory medium of claim 32, further comprising instructions that, when executed by the processor, cause the processor to write the stuff instruction as one of a start instruction and a resume instruction to selectively reset the particular thread of the multi-threaded processor.

35. The computer readable non-transitory medium of claim 32, wherein the stuff instruction is unrelated to a program being debugged by the debugging process.

* * * * *